United States Patent
Brexeler et al.

(10) Patent No.: US 9,776,346 B2
(45) Date of Patent: Oct. 3, 2017

(54) PARTICLE FOAM COMPONENT AND METHOD FOR PRODUCTION THEREOF

(71) Applicant: KRALLMANN KUNSTSTOFFVERARBEITUNG GMBH, Hiddenhausen (DE)

(72) Inventors: Ingo Brexeler, Wetter/Ruhr (DE); Roland Zeifang, Steinach (DE); Thomas Doll, Oberkirch (DE)

(73) Assignee: KRALLMANN KUNSTSTOFFVER ARBEITUNG GMBH, Hiddenhausen (DE)

( * ) Notice: Subject to any disclaimer, the term of this patent is extended or adjusted under 35 U.S.C. 154(b) by 0 days.

(21) Appl. No.: 14/775,106

(22) PCT Filed: Mar. 11, 2014

(86) PCT No.: PCT/EP2014/000636
§ 371 (c)(1),
(2) Date: Sep. 11, 2015

(87) PCT Pub. No.: WO2014/139667
PCT Pub. Date: Sep. 18, 2014

(65) Prior Publication Data
US 2016/0039127 A1    Feb. 11, 2016

(30) Foreign Application Priority Data
Mar. 12, 2013  (DE) .......................... 10 2013 004 196

(51) Int. Cl.
B29C 44/56    (2006.01)
B29C 45/14    (2006.01)
B29C 44/58    (2006.01)
B32B 5/18     (2006.01)
B32B 27/06    (2006.01)
(Continued)

(52) U.S. Cl.
CPC ............ B29C 44/56 (2013.01); B29C 44/585 (2013.01); B29C 45/1418 (2013.01);
(Continued)

(58) Field of Classification Search
CPC .......... B29C 45/1418; B29C 45/14795; B29C 44/56; B29C 44/585; B29C 44/5627;
(Continued)

(56) References Cited

U.S. PATENT DOCUMENTS

2011/0293914 A1*  12/2011  Maurer ................. B29C 44/569
                                                     428/304.4

FOREIGN PATENT DOCUMENTS

DE     44 06 039 C1     3/1995
DE     101 27 685 A1    12/2002
(Continued)

OTHER PUBLICATIONS

Machine translation of WO 02/04188.*
(Continued)

*Primary Examiner* — Vishal I Patel
(74) *Attorney, Agent, or Firm* — McGlew and Tuttle, P.C.

(57) ABSTRACT

A particle foam component has a foam body, which is provided with a cover layer made of a plastic material at least in partial areas of its outer surface. The foam body has a compressed surface structure in its areas supporting the cover layer. The cover layer is bonded in substance to the compressed surface structure of the foam body. For producing the particle foam component, the foam body is foamed in a mold and the cover layer is foamed or molded integrally in a subsequent method step. A compressed surface structure is formed in the surface areas supporting the cover layer before applying the cover layer, and the cover layer is bonded in substance to the compressed surface structure.

6 Claims, 4 Drawing Sheets

(51) Int. Cl.
    *B29K 23/00*    (2006.01)
    *B29K 25/00*    (2006.01)
    *B29K 105/04*   (2006.01)
    *B29L 9/00*     (2006.01)

(52) U.S. Cl.
    CPC .......... *B29C 45/14795* (2013.01); *B32B 5/18* (2013.01); *B32B 27/065* (2013.01); *B29K 2023/12* (2013.01); *B29K 2025/06* (2013.01); *B29K 2105/04* (2013.01); *B29L 2009/00* (2013.01); *B32B 2266/08* (2013.01)

(58) Field of Classification Search
    CPC ..... B29C 44/5636; B32B 27/065; B32B 5/18; B32B 2266/08; B29K 2105/04; B29K 2025/06; B29K 2023/12; B29L 2009/00
    See application file for complete search history.

(56) References Cited

FOREIGN PATENT DOCUMENTS

| | | |
|---|---|---|
| DE | 203 16 379 U1 | 12/2003 |
| DE | 20 2006 009 569 U1 | 8/2006 |
| WO | 02/04188 A1 | 1/2002 |

OTHER PUBLICATIONS

Carl Hanser Verlag et al., Geschäumte Rippen für dünnwandige Teile, Sep. 30, 2011, found on the Internet on Jul. 2, 2104: https://www.kunststoffe.de/_storage/asset/536017/storage/master/file/5792005/download/Geschäumte Rippen für dünnwandigeTeile.pdf.

* cited by examiner

PARTICLE FOAM COMPONENT AND METHOD FOR PRODUCTION THEREOF

CROSS REFERENCE TO RELATED APPLICATIONS

This application is a United States National Phase Application of International Application PCT/EP2014/000636 filed Mar. 11, 2014 and claims the benefit of priority under 35 U.S.C. §119 of German Patent Application 10 2013 004 196.1 filed Mar. 12, 2013 the entire contents of which are incorporated herein by reference.

FIELD OF THE INVENTION

The present invention relates to a particle foam component having a foam body, which is provided with a cover layer made of a plastic material at least in partial areas of its outer surface.

Further, the present invention pertains to a method for producing a particle foam component, which has a foam body, which is provided with a cover layer made of a plastic material at least in partial areas of its outer surface, wherein the foam body is foamed in a mold and the cover layer is foamed or molded integrally in a subsequent method step.

BACKGROUND OF THE INVENTION

Various embodiments of particle foam components made of foamed plastic, for example, expanded polystyrene (EPS) or expanded polypropylene (EPP) are known and used in many areas in industry, because they have considerable advantages in terms of weight and insulation, especially in terms of heat insulation. They are frequently used, for example, in the automobile industry to reduce weight compared to metallic components or as insulating components against sound, heat or mechanical stress. However, it is disadvantageous that the aesthetic appearance of the surfaces is not attractive and usually does not meet the requirements of designers. In order to meet these requirements, it is known to provide a particle foam component having a subsequent cover layer made of metal, plastic or material. The cover layer made of metal, plastic or material is either subsequently bonded to the particle foam component or fastened to the particle foam component by means of special holders and in particular clips.

Overspraying a particle foam component subsequently at least in some areas with a plastic material, especially a thermoplastic elastomer, has been known for some time. For this purpose, the particle foam component is inserted into the injection mold, wherein a cavity remains between the particle foam component and the injection mold, and a low-viscosity plastic is injected into the cavity at a high temperature and under high pressure.

The plasticized plastic fills out the cavity between the particle foam component and the wall of the injection mold in the form of a melt. Because of the irregular porous surface structure of the particle foam component, the liquid plastic enters undefined into the near-surface areas of the structure of the particle foam component. In this case, undefined accumulations of material form in the near-surface zones of the structure of the particle foam component and thus non-uniform cross sections of the applied thermoplastic cover layer. This is still acceptable in small particle foam components or in particle foam components, which are invisibly inserted for a user; however, the irregularity over time is conspicuous in large, visible particle foam components and very disturbing in terms of aesthetics.

SUMMARY OF THE INVENTION

A basic object of the present invention is to create a particle foam component which is provided with a cover layer of uniform thickness, wherein the cover layer shall be bonded in a reliable and simple manner to the foam body. Further, a method shall be created, with which a corresponding particle foam component can be produced in a simple manner.

With regard to the particle foam component, the above-mentioned object is accomplished by a particle foam component of the present invention. Provisions are made here for the foam body to have a compressed surface structure in its areas supporting the cover layer, wherein the cover layer is bonded in substance to the compressed surface structure of the foam body.

The present invention is based on the basic idea of not applying the cover layer made of preferably thermoplastic plastic directly on the foamed foam body, but rather those surface areas of the foam body, which shall be provided with the cover layer, are compressed before the application of the cover layer. Provisions may be made here, for example, for the foam pores for forming the compressed surface structure to be melted together and to form a closed surface. In this way, the liquid thermoplastic plastic is prevented from penetrating into the foam body during the application, i.e., during the spraying on. Thus, it is ensured by the compressed surface structure of the foam body that the cover layer has a uniform predetermined thickness.

The bonding in substance of the cover layer to the compressed surface structure of the foam body ensures a secure, all-over hold of the cover layer on the foam body, without it requiring the use of adhesives, etc. for this.

In addition thereto, the cover layer may, however, also be bonded in a positive-locking manner and/or nonpositive-locking manner to the compressed surface structure of the foam body.

The plastic material of the cover layer is preferably a thermoplastic elastomer.

Concerning the method, the above-mentioned object is accomplished by a compressed surface structure being formed in the surface areas of the foam body supporting the cover layer before applying the cover layer, wherein the cover layer is bonded in substance to the compressed surface structure.

The original open-pore structure of the foam body is reformed into a homogeneous closed structure by means of compression. Because of the compressed, closed-pore surface structure, the melt flow of the sprayed-on thermoplastic plastic may be uniform and reproducible. This leads to a particle foam component with a defined thickness of the sprayed-on cover layer. The bonding in substance of the cover layer to the compressed surface structure of the foam body ensures a secure, all-over hold of the cover layer on the foam body, without requiring the use of adhesives, etc. for this.

In a possible embodiment of the present invention, provisions may be made for the compressed surface structure of the foam body to be formed directly during the foaming of the foam body in the mold. This is, for example, possible, by the wall of the mold being adjusted to a predetermined temperature in some sections, so that the particle foam forming in the mold during the foaming melts on this wall of the mold, so that the foam particles in this area of the surface melt together and form a closed, compressed surface structure.

However, provisions are preferably made for the compressed surface structure of the foam body to be formed only after the foaming of the foam body. This may take place in the same mold, in which the foam body is also foamed; however, it is also possible to transfer the foam body into a different work station.

The forming of the compressed surface structure of the foam body may be achieved, for example, by the action of an external force of pressure on the foam body. Provisions are preferably made here for those surface areas of the foam body, on which the force of pressure acts, to be melted on at least in some areas before and/or during the application of the force of pressure. A compression of the material and at the same time a smooth outer surface is achieved by means of the melting on and application of the force of pressure.

The force of pressure may be applied, for example, by means of a punch. The punch may also be used at the same time for heating and melting the surface areas of the foam body by the punch being heated. For this purpose, a heating device may be arranged in the punch.

In an especially preferred embodiment of the present invention, provisions are made for the punch to be formed by an adjustable mold part of the mold.

After the compressed structure is formed on the foam body in those surface areas, in which the cover layer shall be applied, the cover layer, which is preferably made of a thermoplastic elastomer, is sprayed onto the foam body in an injection mold. The cover layer here is bonded in substance to the compressed surface structure of the foam body. For this purpose, provisions may be made in a variant of the present invention for the compressed surface structure of the foam body to be melted on or at least partially melted at least in some areas before and/or during the application of the cover layer.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 12:
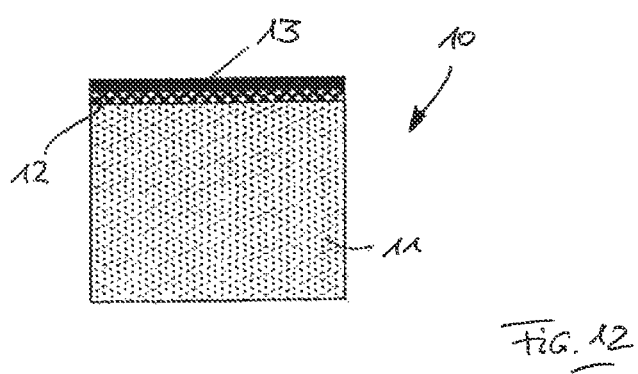
FIG. 12 is a sectional view of the finished particle foam component.

FIG. 12 shows a schematic view of a particle foam component 10, which consists of a foam body 11 made of EPP or EPS and is provided on one side with a cover layer 13 made of a thermoplastic elastomer, wherein the foam body 11 has a compressed surface structure 12 in its areas supporting the cover layer 13.

The method for producing a corresponding particle foam component 10 shall be explained below in detail on the basis of FIGS. 1 through 11.

Figure 1:
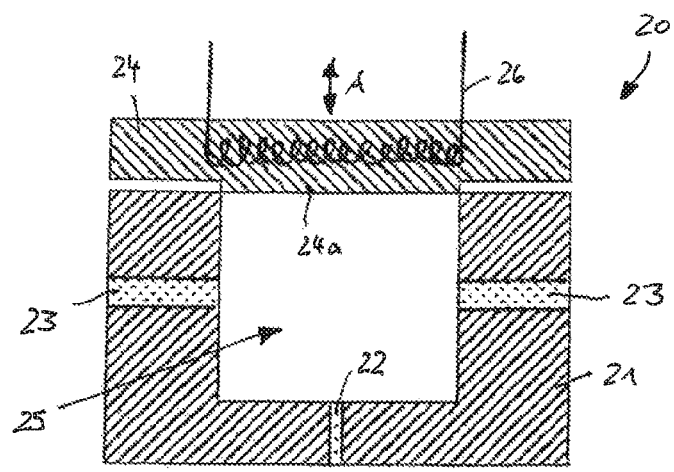
FIG. 1 is a sectional view of a mold for foaming a foam body.
Figure 2:
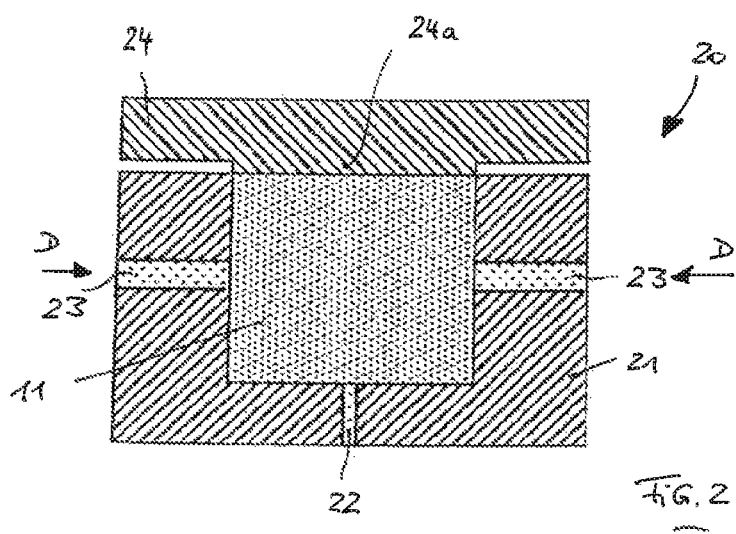
FIG. 2 is a sectional view of the mold according to FIG. 1 with a foamed foam body.
Figure 3:
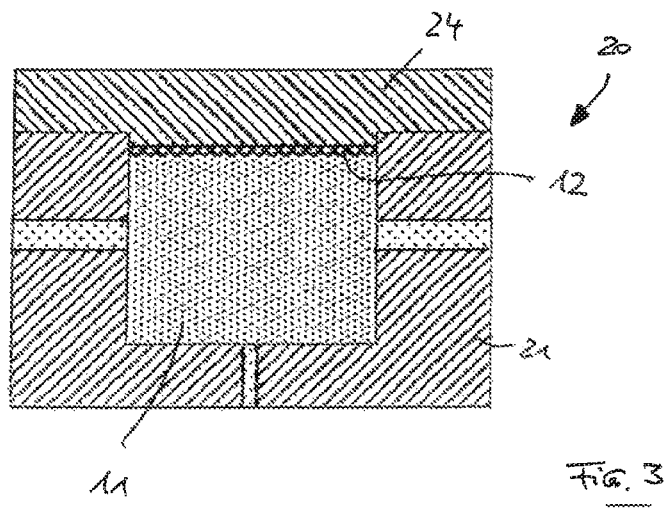
FIG. 3 is a sectional view of the mold according to FIG. 2 after formation of the compressed surface structure.
Figure 4:
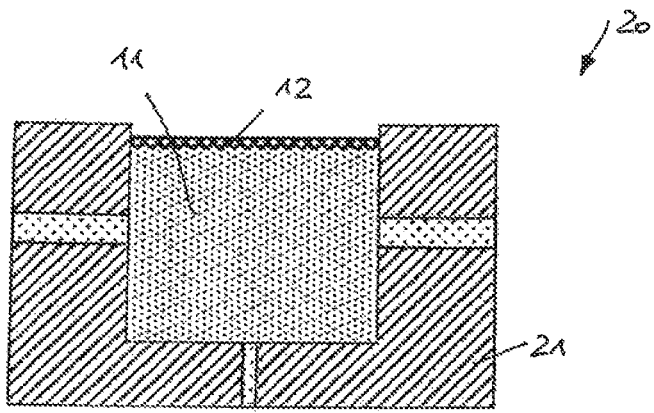
FIG. 4 is a sectional view of the mold according to FIG. 3 after opening the mold.

FIG. 1 shows a schematic view of a mold 20 with a container-like lower mold part 21, in which an only schematically suggested filling nozzle 22 for inserting foamable plastic particles and two steam nozzles 23 for introducing hot steam into a mold cavity 25 defined by the lower mold part 21 are provided. The mold cavity 25 is closed by a cover-like second mold part 24, which can be inserted into the mold cavity 25 with a punch-like attachment 24a. The cover-like second mold part 24 can be adjusted in relation to the first mold part 21, as it is suggested by the double arrow A. Further, the second mold part 24 may be heated up to a desired temperature by means of a heating device 26, which is shown as an example.

In its starting position, the second mold part 24 is retracted from the mold cavity 25 with its punch-like attachment 24a, as it is shown in FIG. 1.

The punch-like second mold part 24 is preheated to a predetermined temperature by activating the heating device 26 and particles made of foamable plastic, especially of EPP or EPS are inserted into the mold cavity 25 by the filling nozzle 22. Hot steam is introduced into the mold cavity 25 by the steam nozzles 23 (arrows D in FIG. 2), as a result of which the particles foam and form a mold cavity 25 forming the entire foam body 11.

After a predetermined residence time of the foam body 11 in the mold cavity 25, the adjustable second mold part 24 is moved, such that it enters the mold cavity 25 with its punch-like attachment 24a and compresses the foam body 11 and melts on the surface facing the punch-like attachment 24a because of its high wall temperature. Due to the melting-on boundary layer of the foam body 11 and the compression resulting from the punch-like attachment 24a of the second mold part 24, a compressed, closed-pore surface structure 12 forms in the surface areas of the foam body 11 coming into contact with the second mold part 24, as it is suggested in FIG. 3.

Figure 5:
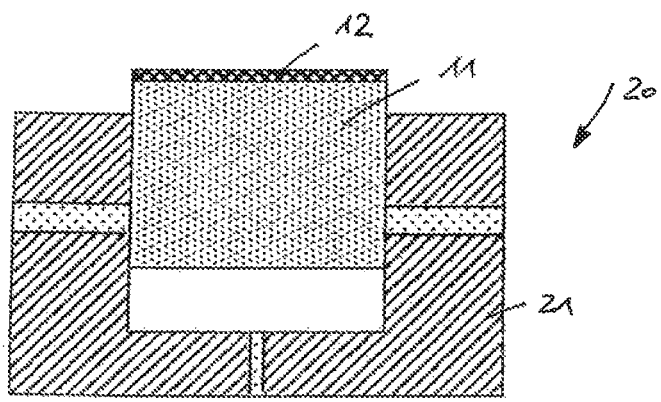
FIG. 5 is a sectional view of the mold according to FIG. 4 upon removal of the foam body.

After a predetermined cooling-off phase, the cover-like second mold part 24 is removed and thus the mold 20 is opened (see FIG. 4) and the foam body 11 with compressed surface structure 12 on the top side can be removed from the mold 20 (see FIG. 5).

Figure 6:
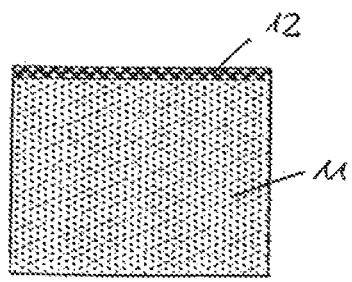
FIG. 6 is a sectional view of the foam body with compressed surface structure.

The cover layer 13 made of a thermoplastic plastic is subsequently sprayed onto the foam body 11 with compressed surface structure 12 shown in FIG. 6 in a further method step, which is explained below on the basis of FIGS. 7 through 11.

Figure 7:
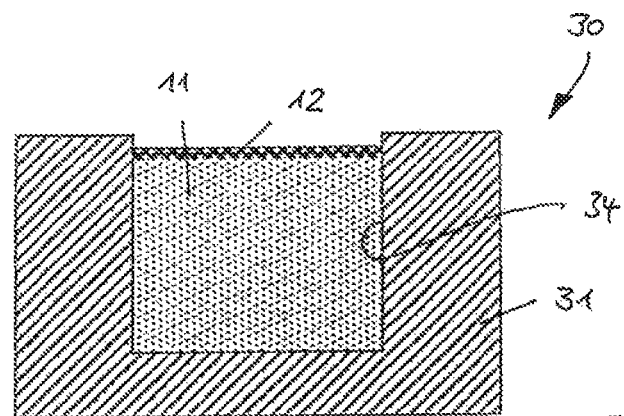
FIG. 7 is a sectional view of an injection mold with inserted foam body.

FIG. 7 shows a schematically shown injection mold 30 with a container-like lower first mold part 31, which defines a cavity 34. The foam body 11 with compressed surface structure 12 can be inserted into the cavity 34, as it is shown in FIG. 7.

Figure 8:
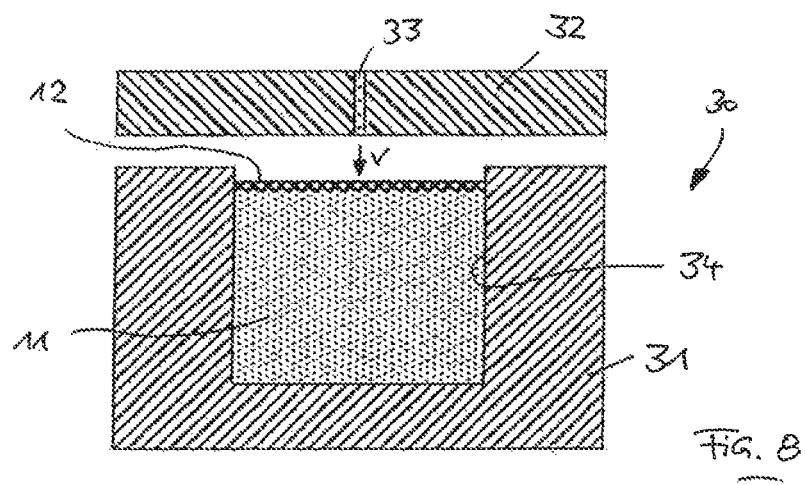
FIG. 8 is a sectional view of an injection mold according to FIG. 7 upon closing.

The injection mold 30 is subsequently closed by a cover-like, upper second mold part 32, in which a spray nozzle 33 is formed, as it is suggested by arrow V in FIG. 8.

Figure 9:
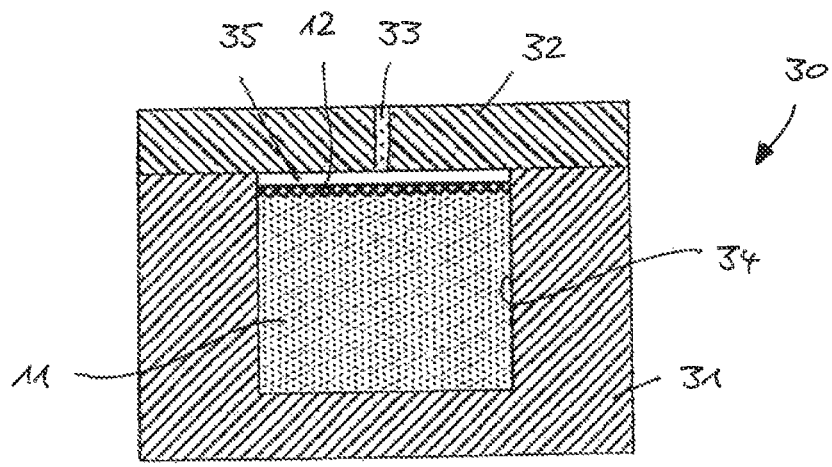
FIG. 9 is a sectional view of the closed injection mold with inserted foam body.
Figure 10:
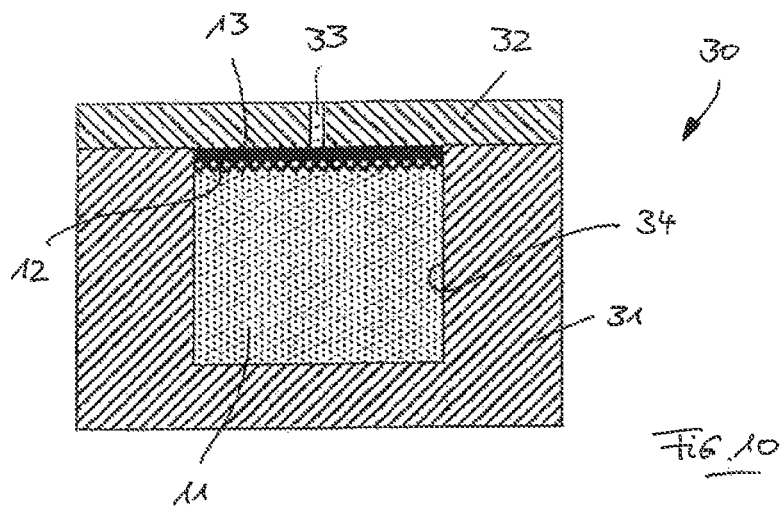
FIG. 10 is a sectional view of the injection mold according to FIG. 9 with molded integrally cover layer.

FIG. 9 shows the closed injection mold 30 with inserted foam body 11, wherein the cavity 34 is somewhat larger than the foam body 11, so that a cavity 35 is formed between the top side of the foam body 11, i.e., between the compressed surface structure 12 of the foam body 11 and the second mold part 32.

A thermoplastic elastomer can be injected into this cavity 35 by the spray nozzle 33, which forms the cover layer 13 and forms a positive-locking bonding to the compressed surface structure 12 of the foam body 11.

Figure 11:
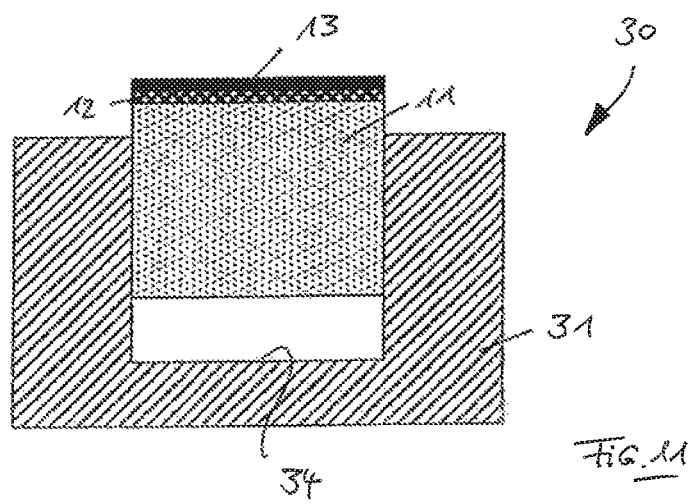
FIG. 11 is a sectional view of the opened injection mold upon removal of the particle foam component.

After a predetermined cooling-off phase, the injection mold 30 is opened and the particle foam component 10 with the foam body 11 and the thermoplastic cover layer 13, which is bonded to the foam body 11 via the compressed surface structure 12, can be removed from the injection mold (see FIG. 11).

While specific embodiments of the invention have been shown and described in detail to illustrate the application of the principles of the invention, it will be understood that the invention may be embodied otherwise without departing from such principles.

The invention claimed is:

1. A method for producing a particle foam component, the method comprising:
    providing a foam body comprising an outer surface, said foam body being provided with a cover layer made of a plastic material at least in partial areas of said outer surface, wherein the foam body is foamed in a mold and the cover layer is foamed or molded integrally in a subsequent method step, wherein a compressed surface structure is formed in said partial areas of the foam body supporting the cover layer before applying the cover layer, and the cover layer is bonded in substance to the compressed surface structure, wherein the compressed surface structure of the foam body is formed by an external force of pressure on the foam body, the compressed surface structure of the foam body being formed after the foaming of the foam body.

2. A method in accordance with claim 1, wherein at least one of:
    surface areas of the foam body, on which the external force of pressure acts, are melted at least in some areas one or more of before applying the external force of pressure; and
    said surface areas of the foam body are melted at least in said some areas during application of the external force of pressure.

3. A method in accordance with claim 1, wherein the external force of pressure is applied by means of a punch.

4. A method in accordance with claim 3, wherein the punch is formed by means of an adjustable mold part of the mold.

5. A method in accordance with claim 1, wherein the plastic material forming the cover layer is a thermoplastic elastomer.

6. A method in accordance with claim 1, wherein at least one of:
    the compressed surface structure is melted in some areas before applying the cover layer; and
    the compressed surface structure is melted in said some areas during application of the cover layer.

* * * * *